Figure 1:
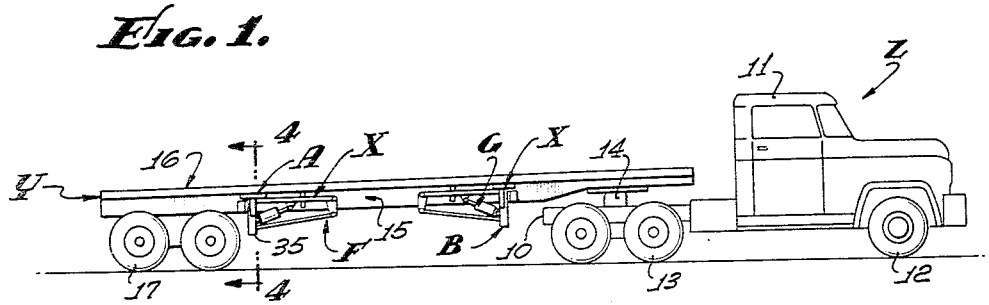

May 3, 1960  P. C. FLY  2,935,214
LIFTING APPARATUS FOR USE WITH VEHICLES OR THE LIKE
Filed Aug. 20, 1956  2 Sheets-Sheet 2
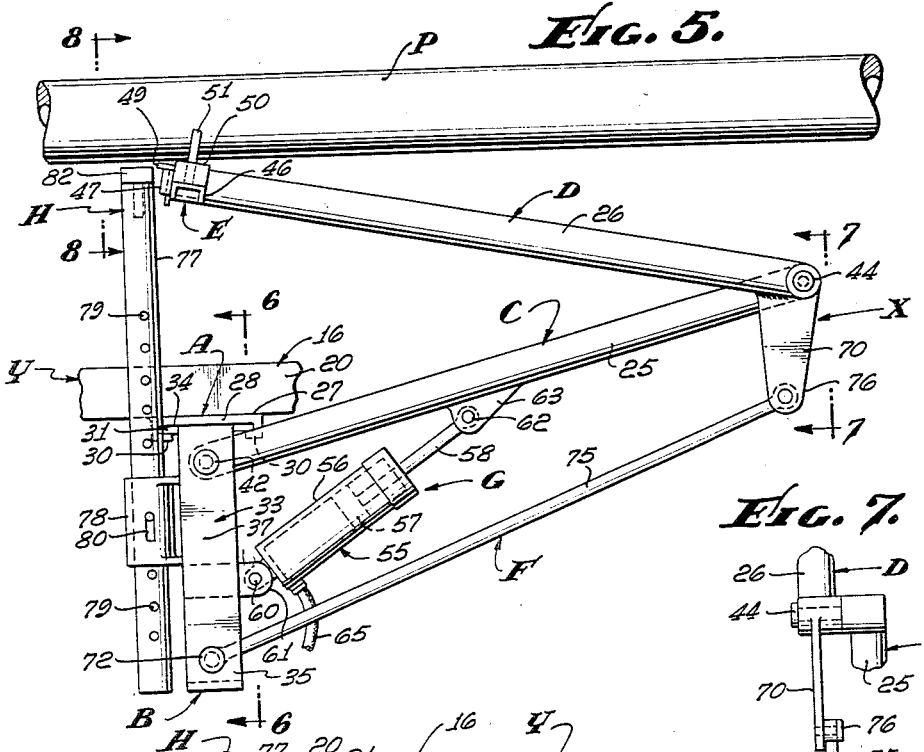
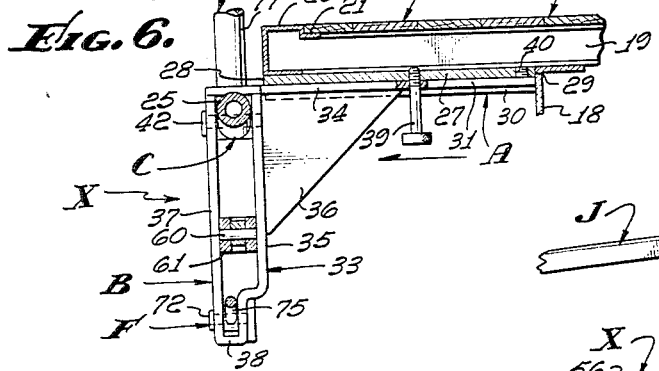
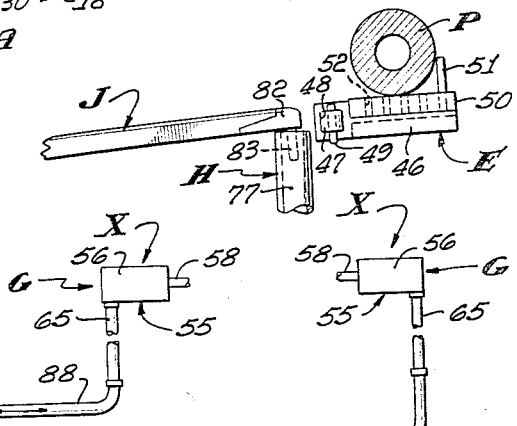
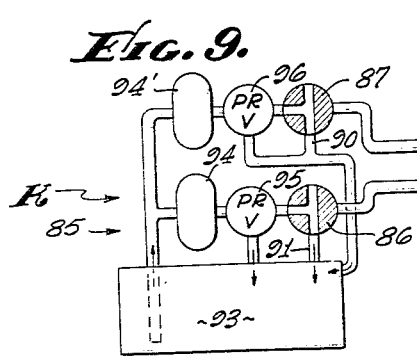
INVENTOR.
PAUL C. FLY
BY
W. H. Maxwell
AGENT.

May 3, 1960  P. C. FLY  2,935,214
LIFTING APPARATUS FOR USE WITH VEHICLES OR THE LIKE
Filed Aug. 20, 1956  2 Sheets-Sheet 1

INVENTOR.
PAUL C. FLY
BY
Wm. H. Maxwell
AGENT.

__United States Patent Office__

2,935,214
Patented May 3, 1960

2,935,214

LIFTING APPARATUS FOR USE WITH VEHICLES OR THE LIKE

Paul C. Fly, Ventura, Calif., assignor of one-half to Harry E. Newell, Ventura, Calif.

Application August 20, 1956, Serial No. 605,011

9 Claims. (Cl. 214—77)

This invention has to do with a lifting apparatus and in particular with an apparatus for use with vehicles such for example as trucks and trailers, and the like, it being a general object of this invention to provide a simple and practical lifting apparatus for loading and unloading vehicles.

Trucks and like vehicles, such as trailers and semi-trailers are used to haul loads of materials and equipment of many varieties. In many cases, elongate materials are handled, much as lengths of rod and pipe. Especially in the oil field, there is a need for economically loading and unloading lengths and/or stands of casing, drill pipe and tubing, and like sections of material. Another item handled in the oil fields is drill collars which are lengthy elements that are extremely heavy and cumbersome. Ordinary methods of loading and unloading pipe and drill collars onto and off of trucks involve the use of winches and tackle of various description. In any case, ordinary methods are primitive and are time consuming and require special skills in the handling of the winches and tackle involved. Heretofore, the raising or lowering of pipe relative to the bed of a truck has been a slow tedious operation that must be conducted by skilled workmen.

The loading and unloading of pipe relative to truck beds is advantageously carried out by maneuvering the truck so that the side of the truck bed is adjacent to the spot or place where the pipe is to be loaded or unloaded. Loading platforms and the like that have been provided at the rear end of truck beds are, therefore, unsatisfactory. It is apparent then that a side loading apparatus is desirable in order to handle lengths of pipe or tubing that are coextensive with the bed of the truck. I have provided such a device in the form of an apparatus that will advantageously handle lengths of material coextensive with the bed of a truck to quickly load and unload said material with a minimum of labor and effort.

An object of this invention is to provide an apparatus adapted to load and unload a vehicle body from the side thereof. With the apparatus that I provide, objects or lengths of materials such for example as pipe or the like may be quickly and easily lifted or lowered relative to the bed at one side thereof.

It is another object of this invention to provide an apparatus adapted to lift along a vertical or substantially vertical path. The apparatus that I provide lifts objects vertically or substantially so, to the end that movement and placement of the material or object is predictable.

It is still another object of this invention to provide an apparatus of the character referred to that can be adapted to or applied to the bed of a truck or like vehicle without alteration of said bed. The apparatus that I provide is easily installed in working position on the side of a vehicle bed with a minimum of time and effort.

It is also an object of this invention to provide an apparatus of the character referred to that is collapsible and/or retractable so that it can be stored in a minimum of space when not in use or operation. The apparatus of the present invention is both collapsible and retractable so that it can be conveniently stored and carried at the underside of a vehicle bed.

Another object of this invention is to provide a lifting apparatus of the character referred to that involves units of construction that are alike and which are adapted to be used in pairs.

It is still another object of this invention to provide a control for synchronizing operation of a plurality of lifting units of the character above referred to. The control that I provide is preferably hydraulic and severally and individually governs action of the individual lifting units.

Figure 2:
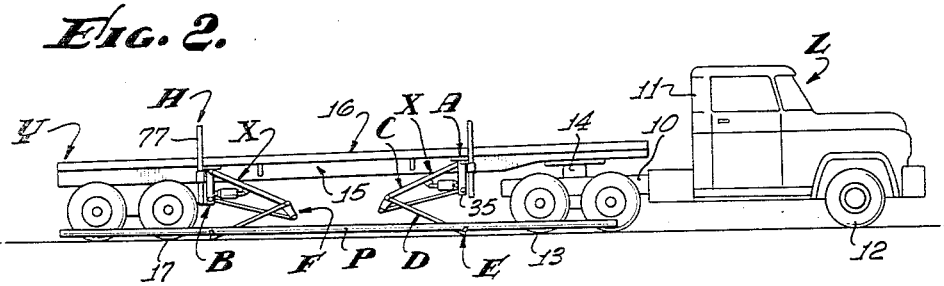
Figure 3:
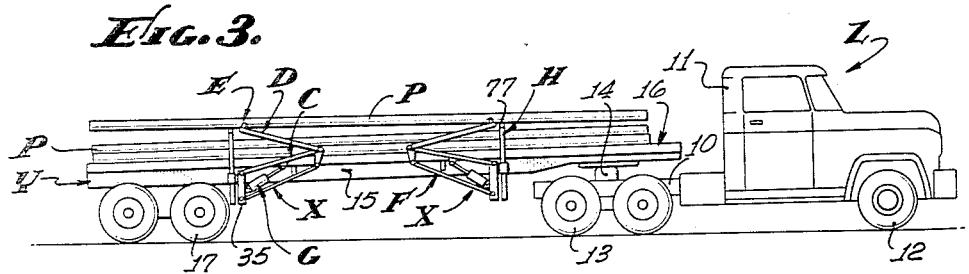
Figure 4:
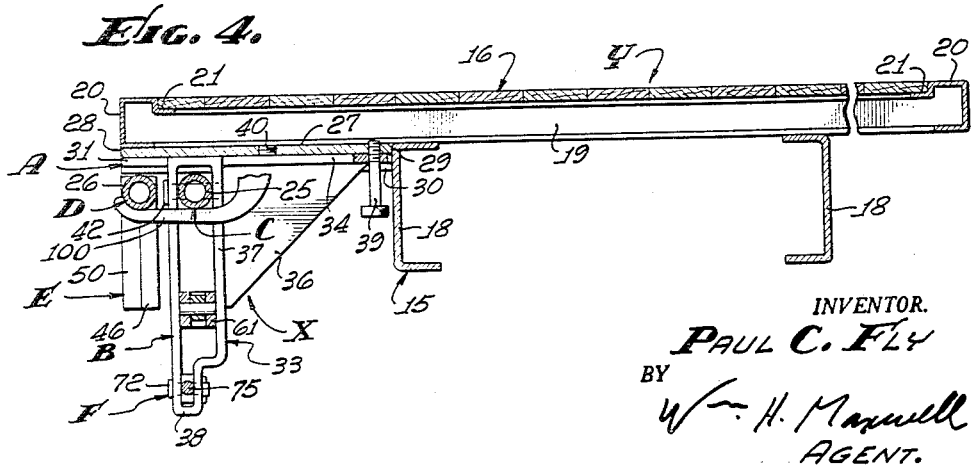

The various objects and features of my invention will be fully understood from the following detailed description of a typical preferred form and application of my invention, throughout which description reference is made to the accompanying drawings, in which:

Fig. 1 is a side elevation of a truck and trailer and illustrates the apparatus of the present invention applied thereto. Figs. 2 and 3 are views similar to Fig. 1 showing apparatus of the present invention in different operative positions. Fig. 4 is an enlarged transverse sectional view taken substantially as indicated by line 4—4 of Fig. 1. Fig. 5 is an enlarged detailed elevation of one of the units provided by the present invention. Fig. 6 is a sectional view of a portion of the structure taken substantially as indicated by line 6—6 on Fig. 5. Fig. 7 is a view taken as indicated by line 7—7 on Fig. 5. Fig. 8 is a view taken as indicated by line 8—8 on Fig. 5, and Fig. 9 is a diagrammatic view of the control means for operating the structure that I provide.

The lifting apparatus of the present invention is particularly adapted to handle elongate objects or materials P and preferably involves a pair of like lifting units X. It is to be understood that the individual lifting units X are usable by themselves in that each one is readily adapted to elevate any suitable platform, or the like. In the drawings I have illustrated a pair of lifting units X applied to the side of a semi-trailer Y that is attached to a tractor Z, the tractor Z involves a frame 10 supporting a cab 11 and carried by a pair of front wheels 12 and a set of rear wheels 13. The trailer Y is pivotally attached at its front end to the tractor Z at 14 and involves a frame 15 supporting a bed 16 and carried at 14 and by a set of rear wheels 17. The trailer Y shown in the drawings may be of any suitable construction, the frame 15 comprising the usual pair of longitudinally extending parallel frame members 18. The members 18 are suitably supported at 14 and by the wheels 17 and carry transverse beams 19. The beams 19 join with and support inside rails 20, one at each side of the bed 16. The rails 20 have an inner channel 21 for receiving a floor 22. The floor 22 may be made of boards of wood or the like, supported by the beams 19. The semi-trailer Y and bed 16 thereof may involve various other features of construction not necessary to an understanding of the invention herein disclosed.

The lifting units of the present invention are particularly adapted for loading and unloading a vehicle from the side thereof, and as clearly illustrated in the drawings, the units X are advantageously used in pairs. As shown, the units X are spaced apart longitudinally of the vehicle and are engageable with the opposite end portions of the object to be handled or loaded. Spaced units X are particularly adapted to handle elongate parts such as lengths of pipe or structural elements or sections of various kinds.

The lifting units X are alike and each involves, generally, a base A, a frame B, an actuator C in the form of a pivotally mounted arm 25, a shiftable support D in the form on an arm 26 pivotally carried by the actuator C, a carrier E carried by the support D, a means F adapted to shift the support D when the actuator C is operated, operating means G for shifting the actuator C, a guide means H for retaining objects on the carrier E, a skid J for transferring objects to and from the carrier E, and a control means K for the units X and for synchronizing a pair of units X.

The base A is provided to support the structure of the unit X and is adapted to shiftably carry and support the frame B thereof. The base A involves a horizontally disposed body 27 that is elongate and is disposed to extend transversely of the bed 16 of the vehicle. The bodies 27 of the units X may be suitably located on the vehicle as circumstances require, a typical positioning of said bodies being shown in the drawings. It is to be understood that bases A may be installed at both sides of the vehicle and that the frames B may be transferred from one side of the vehicle to the other, as desired. In the drawings, however, I have shown the units X applied to one side of the vehicle only. As clearly illustrated, the body 27 terminates in an outer end 28 that is preferably positioned to be flush with the outside edge of the rail 20 at the side of the vehicle. The inner end 29 stops at the frame member 18, the body 27 being secured as by welding or the like to suitable parts of the vehicle structure, as shown. In the preferred form of the invention the body 27 is provided with a pair of spaced parallel guide elements 30 that oppose each other to form a guide way 31 that slideably receives the frame B. Thus the frame B is shiftable transversely of the vehicle between a retracted position as shown in Fig. 4 and an extended position as shown in Fig. 6.

The frame B is provided to shiftably support the working elements of the unit X and is slideably carried by the base A above described. The frame B involves, generally, a bracket 33 that is slideably engaged in the guide way 31. It is shiftable transversely of the vehicle. The bracket 33 has a horizontally disposed slide 34 slideably engaged in the guide way 31, and has a support 35 that depends from the slide 34 to carry the various other elements of the structure as hereinafter described. The bracket 33 and support 35 are held rigid with each other by means of a brace 36, the support 35 being made up of parallel vertically disposed bars 37 spaced laterally of each other. Suitable spacers 38 extend between the bars 37 to hold the bars in fixed relationship. In order to secure the frame B in a fixed position, a pin 39 is provided that may be releasably engaged in one of a plurality of adjustment holes 40 that are provided in the base A. It will be apparent how the frame B may be shifted to be retracted or extended as desired.

The actuator C is provided to shift and to cause operation of the support D and is in the form of an arm 25. The arm 25 is an elongate part preferably tubular in cross section and is pivotally connected at its inner end to the support 35 at the upper end of the support. The arm is horizontally disposed when in a normal or unactuated position and is connected to the support 35 by a pivot pin 42 that extends between the upper end portions of the two bars 37. The axis of the pin 42 is horizontal and extends transversely of the vehicle so that the arm 25 swings in a vertical plane parallel to the side rail 20 of the bed 16.

The shiftable support D is provided to elevate the load to be handled by the structure and is in the form of an arm 26. The arm 26 is an elongate part preferably tubular in cross section and is pivotally connected at its inner end to the outer end of the arm 25 above described. The arm 26 is horizontally disposed like the arm 25 when it is in a normal or unactuated position, and is connected to the arm 25 by a pivot pin 44. In practice, the arms 25 and 26 are coextensive in length and when they are in the normal or unactuated position they lie side by side in a common horizontal plane. The pin 44 projects laterally and outwardly from the side of the arm 25 on a horizontal axis and rotatably engages with an opening in the inner end portion of the arm 26. It will be apparent how the arm 25 swings and carries the arm 26 and how the arm 26 swings relative to the arm 25. The arm 26, like the arm 25, swings in a vertical plane parallel to the side rail 20 of the vehicle.

The carrier E is provided to support the load to be handled by the structure and is a collapsible part adapted to shift between a normal or unactuated position and a working position. When in the normal or unactuated position the carrier E is vertically disposed, while in the operating or working position the carrier E is substantially horizontally disposed. As shown in Fig. 8, the carrier E is pitched slightly so that the lead or pipe P will roll inwardly toward the vehicle. The carrier E is preferably in the form of an extension 46 of the arm 26 that projects laterally from the outer end of the arm. The extension 46 is adjustably carried by the outer end of the arm 26 to occur in either of the said positions and in the preferred form of the invention the outer end portion 47 of the arm 26 is polygonal and engages in an opening 48 in the upper or inner end of the extension 46. The opening 48 in the extension 46 is slideably engaged over the end portion 47 of the arm 26 and is held on the arm by a suitable key 49. It will be apparent that the extension 46 remains horizontal as the arms 25 and 26 swing. In practice a pad 50 is carried at the upper side of the extension 46 and a stop pin 51 projects vertically from the extension on an axis normal thereto. The pin 51 is releasably carried in any one of a series of holes 52 provided therefor in the upper face of the pad 50. The pin 51 may be employed as and when circumstances require.

The means F is provided to shift the support D when the actuator C is operated by the operating means G and is adapted to swing the arm 26 of the support D above and below a horizontal plane. That is, the arm 26 does not remain level at all times but swings away from the horizontal plane to lower and elevate the load carried by the structure. As clearly illustrated in the drawings, the means F involves a lever 70 and a link 75. The lever 70 is an elongate element that is normal to the axis of the arm 26 and projects downwardly therefrom. The lever 70 is at the pivotal end of the arm 26 and the pin 44 forms the fulcrum of the lever 70, the arm 26 and the lever 70 forming, in effect, a bell crank. The link 75 is a straight elongate tension element that extends between the support 37 and the lever 70 to shift the lever when the arm 25 is operated by the means G.

In accordance with the invention the link 75 is pivotally connected at its terminal ends to the support 35 and to the lever 70, and further the pivotal points of the structure are so arranged as to cause shifting of the lever 70, resulting in shifting of the arm 26. When the parts of the structure are in the normal or unactuated position, the arms 25 and 26 are horizontally disposed and the lever 70 is vertically disposed. The support 35 is a vertically disposed part, the inner end of the link 75 being pivotally connected to the lowermost end of the support by the pin 72. The outer end of the link 75 is pivotally connected to the lowermost end of the lever 70 by a pin 76, as shown, the distance between the pin 42 and the pin 72 being substantially greater than the distance between the pin 44 and the pin 76. In practice, I make the arm 25 and link 75 six feet in length and space, the pins 42 and 72 18 inches apart, and the pins 44 and 76 10½ inches apart. With the size and relationship of parts just described the structure is adaptable to the usual trucking equipment and the lever 70 swings outwardly when the arm 25 is lowered to further lower the arm 26 and the lever 70 swings inwardly when the arm 25 is raised.

The operating means G is provided to shift the carrier E carried by the support D and operates to actuate the actuator C to effect operation of the entire structure. As clearly illustrated throughout the drawings, the means F operates to shift the arm 25 and preferably involves a hydraulic cylinder and piston unit 55 connected between the support 35 and the arm 25. When the arm 25 is pivotally connected to the upper end of the support 35 the unit 55 is connected to the support at a point remote from the said arm connection, preferably at a point substantially below said pivotal connection, as shown. The unit 55 is connected to the arm 25 at a point intermediate the ends thereof, preferably, about midway therebetween. The cylinder and piston unit 55 involves a cylinder 56 pivotally anchored at one end, a piston 57 operating in the cylinder and a piston rod 58 projecting from the other end of the cylinder and pivotally anchored at its outer end. I prefer to anchor the cylinder 56 to the support 35 by means of a pin 60 engaged in a boss 61 carried by the support, and to anchor the rod 58 to the arm 25 by means of a pin 62 engaged in an ear 63 carried by the arm 25.

The cylinder and piston unit 55 is preferably single acting and has a fluid connection 65 provided in the head at the inner end of the cylinder 56 in order to admit and exhaust fluid to or from the cylinder. It will be apparent that the projection or retraction of the rod 58 by movement of the piston 57 in the cylinder 56 will pivotally swing the arm as indicated in the drawings, and will effect movement of the arm 26 and carrier E through the operation of the means F hereinabove described.

The guide H for retaining objects on the carrier E is preferably in the form of a vertically adjustable post 77. The post 77 is slideably carried in a receiver 78 carried by the bracket 33 inwardly of the arm 26 and adjacent the arm. The post 77 is provided with a series of adjustment openings 79 engaged by a stop 80 carried by the receiver 78. The top end of the post 77 is selectively positioned at the height to which the load is to be elevated and prevents the load from shifting off of the carrier E.

A skid J is provided for transferring the load onto or off of the vehicle, and is a simple ordinary nominal length of timber or the like with a fitting 82 that connects it to the top end of post 77, as shown. The fitting 82 has a loose fitting vertically disposed pin 83 that engages in the top end of the post 77. With the skid J as described it is a simple matter to roll or slide the object or load onto or off of the vehicle.

The control means K provides for operation of the operating means G above described and synchronizes operation of a pair of units X as clearly illustrated in the drawings. The means K involves a fluid pressure supply 85, control valves 86 and 87, pressure lines 88 and 89 to the inner ends of the cylinders 56 and exhaust lines 90 and 91 from the valves to the supply 85. The pumps 94 and 94' may be suitably driven by a power take-off in the tractor Z in which case, it is desirable to install the pressure supply 85 in the tractor Z. The pressure supply 85 further includes pressure relief valves 95 and 96 that control the fluid pressure that is delivered to the units X. The control valves 86 and 87 may be suitably located as circumstances require, and are three-way valves provided to individually control the flow of fluid to the separate cylinders 56. Fluid controlled by valves 86 and 87 is directed to the cylinders 56 through the lines 88 and 89 respectively, as shown in Fig. 9, the lines 88 and 89 are connected to the fluid connections 65 of the cylinders and piston units 55, the connections 65 being flexible hose connections. In practice, the valves 86 and 87 are mounted side by side so that the control elements or levers thereof can be manipulated simultaneously by one hand of the operator. It will be apparent that the manual control of the two valves 86 and 87 will result in the desired operation of the units X regardless of the weight distribution of the load being handled, to raise the load as desired. The weight of the apparatus will act to lower the mechanism when fluid is exhausted from the cylinders 56.

From the foregoing it will be apparent that I have provided an extremely simple and practical lifting apparatus adapted to side loading of vehicles of the type under consideration. The individual units X that I have provided are collapsible and are held in a normal unactuated or collapsible position by means of a hanger 100 provided beneath the bed 16 of the vehicle. The hanger 100 is a horizontally disposed finger shaped element which is adapted to have supporting engagement with the arms 25 and 26. The hanger 100 may be suitably fastened to the structure of the vehicle as circumstances require. When the units are collapsed, they are readily retracted to the position shown in Fig. 4 of the drawings to be supported by the hanger out of the way and protected beneath the bed 16 of the vehicle.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A lifting unit of the character described including, a frame, an actuator arm with its inner end pivotally carried by the frame, operating means carried by the frame to shift the actuator arm, a load supporting arm adjacent to and pivotally carried by the outer end of said actuator arm and with its outer end adapted to engage and support a load, and means adapted to shift the supporting arm when the actuator arm is operated to shift and including, a lever arm projecting laterally from the load supporting arm at the end that is carried by the actuator arm, and a link connected between the frame and the lever arm to shift the load supporting arm, the distance between the pivotal connections of the actuator arm and of the link to the frame being greater than the length of the lever arm.

2. A lifting unit of the character described including, a frame, an actuator arm with its inner end pivotally carried by the frame, operating means carried by the frame to shift the actuator arm, a load supporting arm adjacent to and pivotally carried by the outer end of said actuator arm, and means adapted to shift the supporting arm from a normally horizontal position when the actuator arm is operated to shift and including, a lever arm projecting laterally from said supporting arm at the end that is carried by the actuator arm, and a link connected between the frame and the lever arm and under tension to shift the load supporting arm, the distance between the pivotal connections of the actuator arm and of the link to the frame greater than the length of the lever arm.

3. A lifting unit of the character described including, a frame having an elongate vertically disposed support, an actuator arm with its inner end pivotally carried at the upper end of the support and normally horizontally disposed, operating means carried by the support to shift the actuator arm, a load supporting arm adjacent to and pivotally carried at the outer end of the said actuator arm and normally horizontally disposed, and means adapted to shift the supporting arm from said horizontal position when the actuator arm is operated to shift and including, a lever arm depending laterally from the said supporting arm at the end that is carried by the actuator arm, and a link pivotally connected to the lower end of the support of the frame and to the lower end of the lever arm to operate under tension to shift the load supporting arm, the distance between the pivotal connections of the actuator arm and of the link to the frame being greater than the length of the lever arm.

4. A lifting unit of the character described including, a frame, an actuator arm with its inner end pivotally carried by the frame, operating means carried by the frame to shift the actuator arm, a load supporting arm adjacent to and pivotally carried by the outer end of the actuator arm, and means adapted to shift the supporting arm from a normally horizontal position when the actuator arm is operated to shift and including, a lever arm projecting laterally from said supporting arm at the end that is carried by the actuator arm, and a link pivotally connected to the frame and pivotally connected to the lever arm to operate under tension to shift the load supporting arm, the distance between the pivotal connections of the actuator arm and of the link to the frame being greater than the distance between the pivotal connections of the lever arm.

5. A lifting unit of the character described including, a frame having an elongate vertically disposed support, an actuator arm with its inner end pivotally carried at the upper end of the support and normally horizontally disposed, operating means carried by the support to shift the actuator arm, a load supporting arm adjacent to and pivotally carried at the outer end of the said actuator arm and normally horizontally disposed, and means adapted to shift the supporting arm from said horizontal position when the actuator arm is operated to shift and including, a lever arm depending laterally from the said supporting arm at the end that is carried by the actuator arm, and a link pivotally connected to the lever arm to operate under tension to shift the load supporting arm, the distance between the pivotal connection of the actuator arm and the pivotal connection of the link to the support being greater than the length of the lever arm.

6. In combination, a vehicle having an elongate bed, and a lifting unit carried by the vehicle at one side of the bed and including, a frame, an actuator arm pivotally carried by the frame, a load supporting arm pivotally carried by the said actuator arm, a load carrier at the end of the supporting arm, means adapted to shift the supporting arm when the actuator arm is shifted and including a lever arm projecting laterally from the end of the supporting arm that is carried by the actuator arm, and a link connected to the frame and operatively connected to the lever arm, and a guide post projecting vertically from the frame and adjacent the load carrier to retain a load on said load carrier, the distance between the pivotal connections of the actuator arm and of the link to the frame being greater than the length of the lever arm.

7. In combination, a vehicle having an elongate bed, and a lifting unit carried by the vehicle at one side of the bed and including, a frame having an elongate vertically disposed support, an actuator arm pivotally carried at the upper end of the support and normally horizontally disposed, a load supporting arm pivotally carried at the outer end of the said actuator arm and normally horizontally disposed, a load carrier at the outer end of the supporting arm, means adapted to shift the supporting arm when the actuator arm is shifted and including, a lever arm depending laterally from the end of the supporting arm that is carried by the actuator arm, and a link pivotally connected to the lower end of the support of the frame and operatively connected to the lever arm, and a guide post projecting vertically from the support and adjacent the load carrier to retain a load on said load carrier, the distance between the pivotal connections of the actuator arm and of the link to the frame being greater than the length of the lever arm.

8. In combination, a vehicle having an elongate bed, and a pair of spaced lifting units carried by the vehicle at one side of the bed and each including, a frame, an actuator arm pivotally carried by the frame, a load supporting arm pivotally carried by the said actuator arm, a load carrier at the end of the supporting arm, means adapted to shift the supporting arm when the actuator arm is shifted and including, a lever arm projecting laterally from the end of the supporting arm that is carried by the actuator arm, and a link connected to the frame and operatively connected to the lever arm, and a guide post adjacent the load carrier to retain a load on said load carrier, the distance between the pivotal connections of the actuator arm and of the link to the frame being greater than the length of the lever arm.

9. In combination, a vehicle having an elongate bed, and a pair of spaced lifting units carried by the vehicle at one side of the bed and each including, a frame having an elongate vertically disposed support, an actuator arm pivotally carried at the upper end of the support and normally horizontally disposed, a load supporting arm pivotally carried at the outer end of said actuator arm and normally horizontally disposed, a load carrier at the outer end of the supporting arm, means adapted to shift the supporting arm when the actuator arm is shifted and including, a lever arm depending laterally from the end of the supporting arm that is carried by the actuator arm, and a link pivotally connected to the lower end of the support of the frame and operatively connected to the lever arm, and a guide post projecting vertically from the support adjacent the load carrier to retain a load on said load carrier, the distance between the pivotal connections of the actuator arm and of the link to the frame being greater than the length of the lever arm.

References Cited in the file of this patent

UNITED STATES PATENTS

| | | |
|---|---|---|
| 2,656,058 | Foote | Oct. 20, 1953 |
| 2,665,815 | Blight | Jan. 12, 1954 |
| 2,774,494 | Malmstrom | Dec. 18, 1956 |
| 2,820,554 | Vogel | Jan. 21, 1958 |